J. THOMPSON.

Making Hoops.

No. 2,574. Reissued Apr. 23, 1867.

Witnesses:
Geo. Loughborough
Wm. M. Ferguson

Inventor:
John Thompson
By Wm. C. Loughborough Atty for
Martin Reed, Assignee.

N. PETERS, PHOTO-LITHOGRAPHER, WASHINGTON, D. C.

United States Patent Office.

MARTIN REED, OF ROCHESTER, NEW YORK, ASSIGNEE OF JOHN THOMPSON.

*Letters Patent No.* 40,664, *dated November* 17, 1863; *reissue No.* 2,574, *dated April* 23, 1867.

IMPROVEMENT IN MACHINE FOR CUTTING HOOPS.

The Schedule referred to in these Letters Patent and making part of the same.

TO ALL WHOM IT MAY CONCERN:

Be it known that JOHN THOMPSON, of Rochester, in the county of Monroe, and State of New York, invented a new and useful Barrel-Hoop, and Machine for making the same; and I do hereby declare that the following is a full, clear, and exact description thereof, reference being had to the accompanying drawings, making a part of this specification, in which—

Similar letters of reference indicate corresponding parts in the several figures.

The nature of my invention consists, first, in a wooden hoop produced by being cut in a bevelled form from the edge of a plank or bolt, said hoop being cut by a lateral cut of the knife across the edge of the plank; and, second, in a machine for cutting said hoop.

To enable others to make and use my invention, I will describe its construction and operation, first describing the machine.

Figure 1:
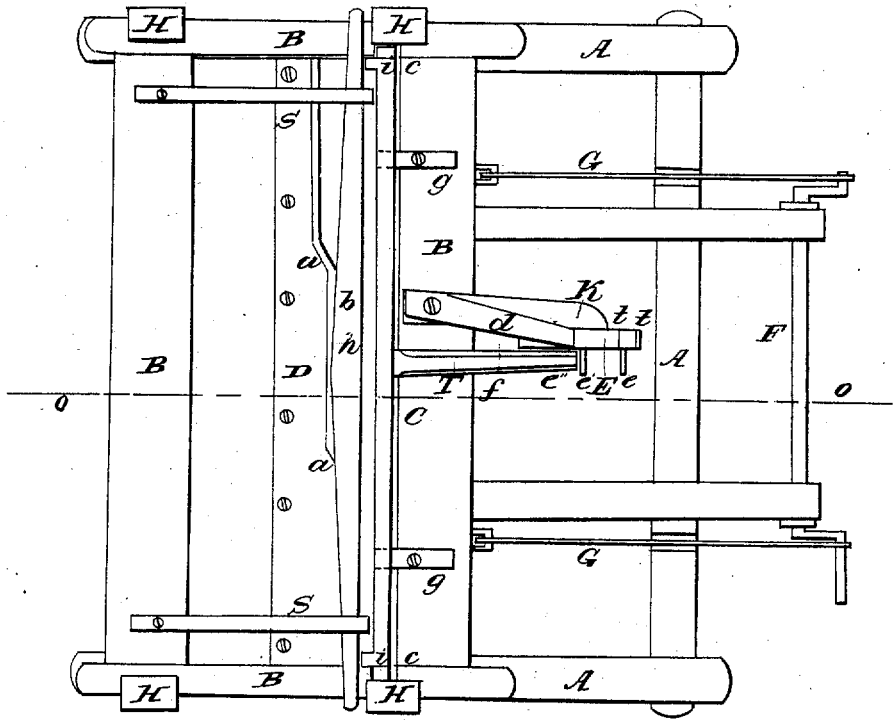
Figure 1 is a plan or top view of the machine.
Figure 2:
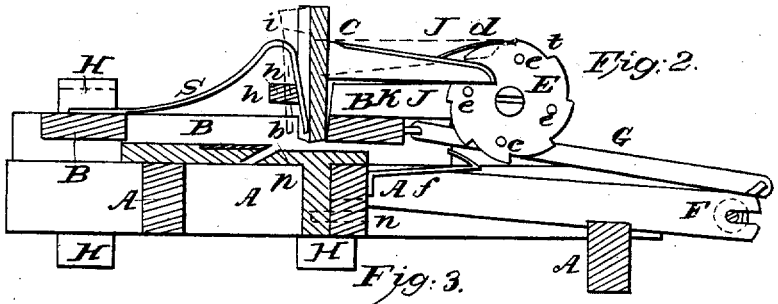
Figure 2 is a vertical section taken in the plane indicated by the red line *o* in fig. 1.
Figure 3:
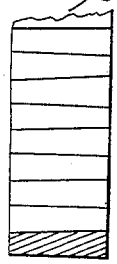
Figure 3 is a transverse section of a hoop.

The several letters A, in the drawings, represent the bed-frame of the machine; B, the sliding frame; C, the self-adjusting rest or cutting bed; D, the knife; E, the ratchet-wheel, which governs the changes in the position of the rest C; F is the driving-shaft, and G the connecting-rods. The bed-frame A may be made of wood or iron, as may also the reciprocating frame B and cutting-bed C. The frame A is provided with lugs, H, which clasp the sides of frame B. The knife D is made the length of a hoop, or a little more, and its edge may be provided with one or more offsets, as seen at *a*, fig. 1, each section, however, being parallel to the rest C. The gauge-rest *b* may be made adjustable, vertically, by means of set-screws, shown by dotted lines at *n*, fig. 2, passing through slots in the girt A′ and into the vertical plate *p* of the gauge. The object of this adjustment is to regulate the thickness of the hoops. The rest C, if made of wood, may be faced with a plate of iron at the lower edge toward the knife, in which case this plate may project at each end into a recess, *c*, formed in each side rail of the frame B, and constitute the pivot on which the rest swings. The latter should be so hung as to just clear the knife while passing over it. The adjusting lever J of the rest is operated by the pins *e* in the ratchet-wheel E, which is hung to the arm K, the latter being fixed to the sliding frame B. The wheel is provided with eight hook-teeth, *t*, (or twice as many teeth as there are pins, *e*,) and the spring pawl *d* prevents it from turning one way, while the spring catch *f*, which is fixed to the bed-frame, turns it one notch in the opposite direction at every turn of the driving-shaft. The rest C is kept in its place by the buttons *g*, fig. 1, and the bolt or plank from which the hoops are being cut is pressed firmly against the rest by the springs *s*, which are fixed to the sliding frame B. The timber is first sawed into planks or boards corresponding in thickness to the desired width of the hoops. The bolts are then made by cutting the planks into hoop lengths. A bolt is then placed between the springs *s* and rest C and the brackets *i*, with its lower edge resting upon the gauge *b*, and as the rest is driven to the left the knife cuts one hoop from the bolt at one stroke, but only one-third its length at a time, which requires so much less power than to cut the whole length at once. When the sliding frame returns the ends of the relieving bar *h* strike the lugs H just before the frame reaches its backward stroke, thus forcing the springs *s*, to which the bar is fixed, away from the bolt, and its own gravity carries it down upon the gauge. The next stroke relieves the bar and the springs again catch and hold the bolt during the next cut. While this adjustment of the bolt is being effected the wheel E is turned one notch, causing the end of the lever J to fall from pin *e′* to pin *e″*, thereby changing the position of the rest, the top being thrown back from the position shown by the dotted lines J′, fig. 2. This gives the "bevel," making one edge of the hoop thick and the other thin, as shown in fig. 3, which conforms it to the shape of the barrel or cask. At the next stroke, the wheel E being turned one tooth more, the pin *e″* is carried up and the end of the lever J with it, where the latter is held until after the next cut is made, and the next adjustment of the wheel drops the lever to the next pin, and so on. If necessary, there may be a spring or weight attached to the lever J to keep it down upon the pins. The sides of the hoops produced by this machine are perfectly smooth and ready for use in that respect, and the edges may be made smooth also, when desirable, by planing the lumber before it is cut up. The bolts may be soaked in water, or steamed if desired, preparatory to cutting them, and after one is placed in the machine no further attention is required until it is nearly cut up, when another may be supplied, and in the interim the operator may be feeding the hoops to a crimping machine, or he may be assorting and packing them. The sawed hoop is by far the cheapest heretofore made, but while one hoop is being sawed a perfect cutting machine working upon my plan will produce from twenty to thirty in a much more perfect condition as regards finish. They may be made of any desired width or thickness, and more or less bevelled to conform them to the bilge or swell of the barrel or cask. The red lines in fig. 3 indicate a remaining portion of the plank from which the hoops are being cut.

What I claim as my invention, and desire to secure by Letters Patent, is—

1. The combination of the irregular-shaped knife D with the automatically adjusting rest C and adjustable gauge *b*, as and for the purpose set forth.

2. The employment of the knife D, constructed with one or more offsets in its cutting edge, as described and for the purpose set forth.

3. The combination of the wheel E, the spring pawl *d*, and clutch *f*, or their equivalents, with the rest C, as and for the purpose set forth.

4. I claim as an improvement in the manufacture of hoops the cutting of the hoop from the edge of the plank by a cut alternately in a bevel line and in a right line to the side of the plank or in alternate bevel lines.

MARTIN REED.

Witnesses:

WM. S. LOUGHBOROUGH,

E. W. BRYAN.